US010917614B2

United States Patent
Haler et al.

(10) Patent No.: US 10,917,614 B2
(45) Date of Patent: *Feb. 9, 2021

(54) MULTI-FUNCTIONAL REMOTE MONITORING SYSTEM

(71) Applicant: Digital Ally, Inc., Lenexa, KS (US)

(72) Inventors: Robert D. Haler, Blue Springs, MO (US); Leslie R. Pingel, Excelsior Springs, MO (US); Yancy E. Scroggins, Kansas City, MO (US); Walter T. Morrey, Lee's Summit, MO (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,505

(22) Filed: Apr. 1, 2019

(65) Prior Publication Data
US 2019/0230321 A1 Jul. 25, 2019

Related U.S. Application Data

(63) Continuation of application No. 13/959,142, filed on Aug. 5, 2013, now Pat. No. 10,271,015, which is a
(Continued)

(51) Int. Cl.
*H04N 7/18* (2006.01)
*G01S 5/00* (2006.01)
*H04M 11/04* (2006.01)

(52) U.S. Cl.
CPC ............. *H04N 7/18* (2013.01); *G01S 5/0009* (2013.01); *H04M 11/04* (2013.01)

(58) Field of Classification Search
CPC ..... H04L 67/12; H04L 67/10; H04L 12/4641; H04L 63/20; H04L 47/24; H04L 63/061;
(Continued)

(56) References Cited

U.S. PATENT DOCUMENTS 4,409,670 A   10/1983   Herndon et al.
4,789,904 A   12/1988   Peterson
(Continued)

FOREIGN PATENT DOCUMENTS

DE   102010019451 A1   11/2011
EP        2479993 A2    7/2012
(Continued)

OTHER PUBLICATIONS

Ecplaza HY-001HD law enforcement DVR, http://fireeye.en.ecplaza.net/law-enforcement-dvr--238185-1619696.html, Sep. 26, 2013, Date Posted: Unknown, pp. 1-3.
(Continued)

*Primary Examiner* — George Eng
*Assistant Examiner* — Jing Gao
(74) *Attorney, Agent, or Firm* — Erise IP, P.A.

(57) ABSTRACT

A multi-functional remote monitoring system for use in a mobile surveillance system comprising a host controller, at least one hub transceiver, and at least one remote monitoring transmitter ("RMT") operable to capture and transmit data, wherein the hub transceiver is operable to communicate to and receive data from the at least one RMT. The hub transceiver and the RMT are adapted for bi-directional transmission and receipt of data, including audio and data signals. The host controller is operable to control the hub transceiver and facilitate communication of the audio and data signals between the RMTs and the hub transceiver.

20 Claims, 4 Drawing Sheets

Related U.S. Application Data continuation of application No. 12/609,811, filed on Oct. 30, 2009, now Pat. No. 8,503,972.

(60) Provisional application No. 61/109,858, filed on Oct. 30, 2008.

(58) Field of Classification Search
CPC ... H04L 63/0823; H04L 63/10; H04L 67/104; H04L 67/1095; H04L 67/303; H04L 12/2823; H04L 12/2854; H04L 12/40006; H04L 2012/40273; H04L 2209/127; H04L 25/20; H04L 41/0803; H04L 41/0893; H04L 41/28; H04L 5/0058; H04W 12/06; H04W 4/22; H04W 84/18; H04W 88/02; H04W 12/08; H04W 4/005; H04W 4/02; H04W 48/04; H04W 4/021; H04W 4/023; H04W 76/02; H04W 76/021; H04W 84/12; H04W 88/06; H04W 8/005; H04W 36/0055; H04W 40/12; H04W 40/20; H04W 48/02; H04W 48/18; H04W 4/006; H04W 52/0229; H04W 52/28; H04W 64/003; H04W 64/006; H04W 76/023; H04W 84/005; H04W 88/04; G01M 99/008; H04N 7/18; G01S 5/0009; H04M 11/04

See application file for complete search history.

(56) References Cited

U.S. PATENT DOCUMENTS

| | | |
|---|---|---|
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kaikinami et al. |
| 5,111,289 A | 5/1992 | Lucas et al. |
| 5,289,321 A | 2/1994 | Secor |
| 5,381,155 A | 1/1995 | Gerber |
| 5,408,330 A | 4/1995 | Squicciarii et al. |
| 5,446,659 A | 8/1995 | Yamawaki |
| 5,453,939 A | 9/1995 | Hoffman et al. |
| 5,473,501 A | 12/1995 | Claypool |
| 5,473,729 A | 12/1995 | Bryant et al. |
| 5,479,149 A | 12/1995 | Pike |
| 5,497,419 A | 3/1996 | Hill |
| 5,526,133 A | 6/1996 | Paff |
| 5,585,798 A | 12/1996 | Yoshioka et al. |
| 5,642,285 A | 6/1997 | Woo et al. |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,962,806 A | 10/1999 | Coakley et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price R-W et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,141,611 A | 10/2000 | Mackey et al. |
| 6,163,338 A | 12/2000 | Johnson et al. |
| 6,175,300 B1 | 1/2001 | Kendrick |
| 6,298,290 B1 | 10/2001 | Abe et al. |
| 6,310,541 B1 | 10/2001 | Atkins |
| 6,314,364 B1 | 11/2001 | Nakamura |
| 6,324,053 B1 | 11/2001 | Kamijo |
| 6,326,900 B2 | 12/2001 | Deline et al. |
| 6,333,694 B2 | 12/2001 | Pierce et al. |
| 6,333,759 B1 | 12/2001 | Mazzilli |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,449,540 B1 | 9/2002 | Rayner |
| 6,452,572 B1 | 9/2002 | Fan et al. |
| 6,490,409 B1 | 12/2002 | Walker |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,563,532 B1 | 5/2003 | Strub et al. |
| 6,591,242 B1 | 7/2003 | Karp et al. |
| 6,681,195 B1 | 1/2004 | Poland et al. |
| 6,690,268 B2 | 2/2004 | Schofield et al. |
| 6,697,103 B1 | 2/2004 | Fernandez et al. |
| 6,718,239 B2 | 4/2004 | Rayer |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,877,434 B1 | 4/2005 | McNulty, Jr. |
| 6,883,694 B2 | 4/2005 | Abelow |
| 6,947,071 B2 | 9/2005 | Eichmann |
| 6,970,183 B1 | 11/2005 | Monroe |
| 7,012,632 B2 | 3/2006 | Freeman et al. |
| 7,034,683 B2 | 4/2006 | Ghazarian |
| D520,738 S | 5/2006 | Tarantino |
| 7,038,590 B2 | 5/2006 | Hoffman et al. |
| 7,071,969 B1 | 7/2006 | Stimson, III |
| 7,088,387 B1 | 8/2006 | Freeman et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,180,407 B1 | 2/2007 | Guo et al. |
| 7,190,822 B2 | 3/2007 | Gammenthaler |
| 7,363,742 B2 | 4/2008 | Nerheim |
| 7,371,021 B2 | 5/2008 | Ross et al. |
| 7,421,024 B2 | 9/2008 | Castillo |
| 7,436,143 B2 | 10/2008 | Lakshmanan et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,496,140 B2 | 2/2009 | Winningstad et al. |
| 7,500,794 B1 | 3/2009 | Clark |
| 7,508,941 B1 | 3/2009 | O'Toole, Jr. et al. |
| 7,536,457 B2 | 5/2009 | Miller |
| 7,539,533 B2 | 5/2009 | Tran |
| 7,561,037 B1 | 7/2009 | Monroe |
| 7,594,305 B2 | 9/2009 | Moore |
| 7,602,301 B1 | 10/2009 | Stirling et al. |
| 7,602,597 B2 | 10/2009 | Smith et al. |
| 7,631,452 B1 | 12/2009 | Brundula et al. |
| 7,656,439 B1 | 2/2010 | Manico et al. |
| 7,659,827 B2 | 2/2010 | Gunderson et al. |
| 7,680,947 B2 | 3/2010 | Nicholl et al. |
| 7,697,035 B1 | 4/2010 | Suber, III et al. |
| 7,701,692 B2 | 4/2010 | Smith et al. |
| 7,778,004 B2 | 8/2010 | Nerheim et al. |
| 7,804,426 B2 | 9/2010 | Etcheson |
| 7,806,525 B2 | 10/2010 | Howell et al. |
| 7,853,944 B2 | 12/2010 | Choe |
| 7,944,676 B2 | 5/2011 | Smith et al. |
| 7,984,579 B2 | 7/2011 | Brundula et al. |
| 8,077,029 B1 | 12/2011 | Daniel et al. |
| 8,121,306 B2 | 2/2012 | Cilia et al. |
| 8,175,314 B1 | 5/2012 | Webster |
| 8,269,617 B2 | 9/2012 | Cook et al. |
| 8,314,708 B2 | 11/2012 | Gunderson et al. |
| 8,350,907 B1 | 1/2013 | Blanco et al. |

(56) References Cited

U.S. PATENT DOCUMENTS

| | | |
|---|---|---|
| 8,356,438 B2 | 1/2013 | Brundula et al. |
| 8,373,567 B2 | 2/2013 | Denson |
| 8,373,797 B2 | 2/2013 | Ishii et al. |
| 8,384,539 B2 | 2/2013 | Denny et al. |
| 8,446,469 B2 | 5/2013 | Blanco et al. |
| 8,456,293 B1 | 6/2013 | Trundle et al. |
| 8,508,353 B2 | 8/2013 | Cook et al. |
| 8,559,486 B2 | 10/2013 | Kitayoshi |
| 8,594,485 B2 | 11/2013 | Brundula |
| 8,606,492 B1 | 12/2013 | Botnen |
| 8,676,428 B2 | 3/2014 | Richardson et al. |
| 8,690,365 B1 | 4/2014 | Williams |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,780,205 B2 | 7/2014 | Boutell et al. |
| 8,781,292 B1 | 7/2014 | Ross et al. |
| 8,805,431 B2 | 8/2014 | Vasavada et al. |
| 8,849,501 B2 | 9/2014 | Cook et al. |
| 8,854,199 B2 | 10/2014 | Cook et al. |
| 8,887,208 B1 | 11/2014 | Merrit et al. |
| 8,890,954 B2 | 11/2014 | O'Donnell et al. |
| 8,930,072 B1 | 1/2015 | Lambert et al. |
| 8,934,045 B2 | 1/2015 | Kam et al. |
| 8,989,914 B1 | 3/2015 | Nemat-Nasser et al. |
| 8,996,234 B1 | 3/2015 | Tamari et al. |
| 8,996,240 B2 | 3/2015 | Plante |
| 9,002,313 B2 | 4/2015 | Sink et al. |
| 9,003,474 B1 | 4/2015 | Smith |
| 9,058,499 B1 | 6/2015 | Smith |
| 9,122,082 B2 | 9/2015 | Abreau |
| 9,123,241 B2 | 9/2015 | Grigsby et al. |
| 9,164,543 B2 | 10/2015 | Minn et al. |
| 9,253,452 B2 | 2/2016 | Ross et al. |
| 9,518,727 B1 | 12/2016 | Markle et al. |
| 9,591,255 B2 | 3/2017 | Skiewica et al. |
| 9,728,228 B2 | 8/2017 | Palmer et al. |
| 10,271,015 B2 * | 4/2019 | Haler .................... H04N 7/18 |
| 2001/0033661 A1 | 10/2001 | Prokoski |
| 2002/0013517 A1 | 1/2002 | West et al. |
| 2002/0019696 A1 | 2/2002 | Kruse |
| 2002/0032510 A1 | 3/2002 | Tumball et al. |
| 2002/0044065 A1 | 4/2002 | Quist et al. |
| 2002/0049881 A1 | 4/2002 | Sugimura |
| 2002/0077086 A1 * | 6/2002 | Tuomela ............... H04M 1/576 |
| | | 455/414.1 |
| 2002/0084130 A1 | 7/2002 | Der Gazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0191952 A1 | 12/2002 | Fiore et al. |
| 2003/0040917 A1 | 2/2003 | Fiedler |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081934 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shelter et al. |
| 2003/0133018 A1 | 7/2003 | Ziemkowski |
| 2003/0151510 A1 | 8/2003 | Quintana et al. |
| 2003/0184674 A1 | 10/2003 | Manico et al. |
| 2003/0185417 A1 | 10/2003 | Alattar et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0008255 A1 | 1/2004 | Lewellen |
| 2004/0043765 A1 | 3/2004 | Tolhurst |
| 2004/0143373 A1 | 6/2004 | Ennis |
| 2004/0145457 A1 | 7/2004 | Schofield et al. |
| 2004/0150717 A1 | 8/2004 | Page et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2004/0243734 A1 | 12/2004 | Kitagawa et al. |
| 2004/0267419 A1 | 12/2004 | Jing |
| 2005/0030151 A1 | 2/2005 | Singh |
| 2005/0046583 A1 | 3/2005 | Richards |
| 2005/0050266 A1 | 3/2005 | Haas et al. |
| 2005/0068169 A1 | 3/2005 | Copley et al. |
| 2005/0068417 A1 | 3/2005 | Kreiner et al. |
| 2005/0083404 A1 | 4/2005 | Pierce et al. |
| 2005/0094966 A1 | 5/2005 | Elberbaum |
| 2005/0100329 A1 | 5/2005 | Lao et al. |
| 2005/0101334 A1 | 5/2005 | Brown et al. |
| 2005/0134966 A1 | 5/2005 | Burgner |
| 2005/0132200 A1 | 6/2005 | Jaffe et al. |
| 2005/0151852 A1 | 7/2005 | Jomppanen |
| 2005/0035161 A1 | 8/2005 | Shioda |
| 2005/0185438 A1 | 8/2005 | Ching |
| 2005/0206532 A1 | 9/2005 | Lock |
| 2005/0206741 A1 | 9/2005 | Raber |
| 2005/0228234 A1 | 10/2005 | Yang |
| 2005/0232469 A1 | 10/2005 | Schofield et al. |
| 2005/0243171 A1 | 11/2005 | Ross, Sr. et al. |
| 2005/0258942 A1 * | 11/2005 | Manasseh ............... G07C 5/008 |
| | | 340/425.5 |
| 2006/0009238 A1 | 1/2006 | Stanco et al. |
| 2006/0028811 A1 | 2/2006 | Ross, Jr. et al. |
| 2006/0055786 A1 | 3/2006 | Ollila |
| 2006/0082730 A1 | 4/2006 | Franks |
| 2006/0153740 A1 * | 7/2006 | Sultan ..................... B60K 28/06 |
| | | 422/88 |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0193749 A1 | 8/2006 | Ghazarian et al. |
| 2006/0203090 A1 | 9/2006 | Wang et al. |
| 2006/0220826 A1 | 10/2006 | Rast |
| 2006/0225253 A1 | 10/2006 | Bates |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0271287 A1 | 11/2006 | Gold et al. |
| 2006/0274166 A1 | 12/2006 | Lee et al. |
| 2006/0274828 A1 | 12/2006 | Siemens et al. |
| 2006/0276200 A1 | 12/2006 | Radhakrishnan et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0064108 A1 | 3/2007 | Haler |
| 2007/0067079 A1 | 3/2007 | Kosugi |
| 2007/0091557 A1 | 4/2007 | Kim et al. |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0195939 A1 | 8/2007 | Sink et al. |
| 2007/0199076 A1 | 8/2007 | Rensin et al. |
| 2007/0213088 A1 | 9/2007 | Sink |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0274705 A1 | 11/2007 | Kashiwa |
| 2007/0277352 A1 | 12/2007 | Maron et al. |
| 2007/0285222 A1 | 12/2007 | Zadnikar |
| 2007/0287425 A1 * | 12/2007 | Bates ..................... H04W 4/12 |
| | | 455/412.1 |
| 2007/0297320 A1 | 12/2007 | Brummette et al. |
| 2008/0001735 A1 | 1/2008 | Tran |
| 2008/0002031 A1 | 1/2008 | Cana et al. |
| 2008/0002599 A1 | 2/2008 | Denny et al. |

(56) References Cited

U.S. PATENT DOCUMENTS

| | | |
|---|---|---|
| 2008/0030580 A1 | 2/2008 | Kashhiawa et al. |
| 2008/0042825 A1 | 2/2008 | Denny et al. |
| 2008/0043736 A1 | 2/2008 | Stanley |
| 2008/0049830 A1 | 2/2008 | Richardson |
| 2008/0063252 A1 | 3/2008 | Dobbs et al. |
| 2008/0084473 A1 | 4/2008 | Romanowich |
| 2008/0100705 A1 | 5/2008 | Kister et al. |
| 2008/0122603 A1 | 5/2008 | Piante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |
| 2008/0169929 A1 | 7/2008 | Albertson et al. |
| 2008/0170130 A1 | 7/2008 | Ollila et al. |
| 2008/0175565 A1 | 7/2008 | Takakura et al. |
| 2008/0177569 A1* | 7/2008 | Chen .................. G06F 21/32 705/2 |
| 2008/0211906 A1 | 9/2008 | Lovric |
| 2008/0222849 A1 | 9/2008 | Lavoie |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0307435 A1 | 12/2008 | Rehman |
| 2008/0316314 A1 | 12/2008 | Bedell et al. |
| 2009/0002491 A1 | 1/2009 | Haler |
| 2009/0002556 A1 | 1/2009 | Manapragada et al. |
| 2009/0003490 A1* | 1/2009 | Nadler ................. H04W 64/00 375/316 |
| 2009/0023422 A1* | 1/2009 | MacInnis ............. G06F 16/84 455/411 |
| 2009/0027499 A1* | 1/2009 | Nicholl ................. H04N 7/18 348/158 |
| 2009/0052685 A1 | 2/2009 | Cilia et al. |
| 2009/0070820 A1 | 3/2009 | Li |
| 2009/0085740 A1 | 4/2009 | Klein et al. |
| 2009/0109292 A1 | 4/2009 | Ennis |
| 2009/0122142 A1 | 5/2009 | Shapley |
| 2009/0135007 A1 | 5/2009 | Donovan et al. |
| 2009/0169068 A1 | 7/2009 | Okamoto |
| 2009/0189981 A1 | 7/2009 | Siann et al. |
| 2009/0195686 A1 | 8/2009 | Shintani |
| 2009/0207252 A1 | 8/2009 | Raghunath |
| 2009/0213204 A1 | 8/2009 | Wong |
| 2009/0225189 A1 | 9/2009 | Morin |
| 2009/0243794 A1 | 10/2009 | Morrow |
| 2009/0251545 A1 | 10/2009 | Shekarri et al. |
| 2009/0252486 A1 | 10/2009 | Ross, Jr. et al. |
| 2009/0276708 A1 | 11/2009 | Smith et al. |
| 2009/0294538 A1 | 12/2009 | Wihlborg et al. |
| 2009/0324203 A1 | 12/2009 | Wiklof |
| 2010/0045798 A1 | 2/2010 | Sugimoto et al. |
| 2010/0050734 A1 | 3/2010 | Chou |
| 2010/0060747 A1 | 3/2010 | Woodman |
| 2010/0097221 A1 | 4/2010 | Kreiner et al. |
| 2010/0106707 A1 | 4/2010 | Brown et al. |
| 2010/0118147 A1 | 5/2010 | Dorneich et al. |
| 2010/0122435 A1 | 5/2010 | Markham |
| 2010/0123779 A1 | 5/2010 | Snyder et al. |
| 2010/0177193 A1 | 7/2010 | Flores |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0194885 A1 | 8/2010 | Plaster |
| 2010/0217836 A1 | 8/2010 | Rofougaran |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0265331 A1 | 10/2010 | Tanaka |
| 2010/0274816 A1 | 10/2010 | Guzik |
| 2010/0287473 A1 | 11/2010 | Recesso et al. |
| 2011/0006151 A1 | 1/2011 | Beard |
| 2011/0018998 A1 | 1/2011 | Guzik |
| 2011/0050904 A1 | 3/2011 | Anderson |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0098924 A1 | 4/2011 | Baladeta et al. |
| 2011/0129151 A1 | 6/2011 | Saito et al. |
| 2011/0157759 A1 | 6/2011 | Smith et al. |
| 2011/0187895 A1 | 8/2011 | Cheng et al. |
| 2011/0261176 A1 | 10/2011 | Monaghan, Sr. et al. |
| 2011/0281547 A1 | 11/2011 | Cordero |
| 2011/0301971 A1 | 12/2011 | Roesch et al. |
| 2011/0314401 A1 | 12/2011 | Salisbury et al. |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0120258 A1 | 5/2012 | Boutell et al. |
| 2012/0162436 A1 | 6/2012 | Cordell et al. |
| 2012/0188345 A1 | 7/2012 | Salow |
| 2012/0189286 A1 | 7/2012 | Takayama et al. |
| 2012/0195574 A1 | 8/2012 | Wallace |
| 2012/0230540 A1 | 9/2012 | Calman et al. |
| 2012/0257320 A1 | 10/2012 | Brundula et al. |
| 2012/0268259 A1 | 10/2012 | Igel et al. |
| 2012/0276954 A1 | 11/2012 | Kowalsky |
| 2013/0021153 A1 | 1/2013 | Keays |
| 2013/0033610 A1 | 2/2013 | Osborn |
| 2013/0035602 A1 | 2/2013 | Gemer |
| 2013/0080836 A1 | 3/2013 | Stergiou et al. |
| 2013/0096731 A1 | 4/2013 | Tamari et al. |
| 2013/0125000 A1 | 5/2013 | Flischhauser et al. |
| 2013/0148295 A1 | 6/2013 | Minn et al. |
| 2013/0222640 A1 | 8/2013 | Baek et al. |
| 2013/0225309 A1 | 8/2013 | Bentley et al. |
| 2013/0285232 A1 | 10/2013 | Sheth |
| 2013/0290018 A1 | 10/2013 | Anderson et al. |
| 2013/0300563 A1 | 11/2013 | Glaze |
| 2013/0343571 A1 | 12/2013 | Lee |
| 2014/0037262 A1 | 2/2014 | Sako |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0098453 A1 | 4/2014 | Brundula et al. |
| 2014/0140575 A1 | 5/2014 | Wolf |
| 2014/0170602 A1 | 6/2014 | Reed |
| 2014/0192194 A1 | 7/2014 | Bedell et al. |
| 2014/0195105 A1 | 7/2014 | Lambert et al. |
| 2014/0195272 A1 | 7/2014 | Sadiq et al. |
| 2014/0210625 A1 | 7/2014 | Nemat-Nasser |
| 2014/0218544 A1 | 8/2014 | Senot et al. |
| 2014/0227671 A1 | 8/2014 | Olmstead et al. |
| 2014/0311215 A1 | 10/2014 | Keays et al. |
| 2014/0341532 A1 | 11/2014 | Marathe et al. |
| 2014/0355951 A1 | 12/2014 | Tabak |
| 2015/0050003 A1 | 2/2015 | Ross et al. |
| 2015/0051502 A1 | 2/2015 | Ross |
| 2015/0053776 A1 | 3/2015 | Rose et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0229630 A1 | 8/2015 | Smith |
| 2015/0317368 A1 | 11/2015 | Rhoads et al. |
| 2015/0332424 A1 | 11/2015 | Kane et al. |
| 2015/0358549 A1 | 12/2015 | Cho et al. |
| 2016/0042767 A1 | 2/2016 | Araya et al. |
| 2016/0050345 A1 | 2/2016 | Longbotham |
| 2016/0104508 A1 | 4/2016 | Chee et al. |
| 2016/0127695 A1 | 5/2016 | Zhang et al. |
| 2016/0165192 A1 | 6/2016 | Saatchi et al. |
| 2016/0364621 A1 | 12/2016 | Hill et al. |
| 2017/0070659 A1 | 3/2017 | Kievsky et al. |
| 2017/0195635 A1 | 7/2017 | Yokomitsu et al. |
| 2017/0200476 A1 | 7/2017 | Chen et al. |
| 2017/0230605 A1 | 8/2017 | Han et al. |
| 2017/0237950 A1 | 8/2017 | Araya et al. |
| 2017/0244884 A1 | 8/2017 | Burtey et al. |
| 2017/0277700 A1 | 9/2017 | Davis et al. |
| 2017/0287523 A1 | 10/2017 | Hodulik et al. |

(56) References Cited

U.S. PATENT DOCUMENTS

| | | | |
|---|---|---|---|
| 2018/0023910 A1 | 1/2018 | Kramer | |
| 2018/0050800 A1 | 2/2018 | Boykin et al. | |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2004036926 A2 | 4/2004 |
| WO | 2009013526 A1 | 1/2009 |
| WO | 2011001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS

Edesix VideoBadge, http://www.edesix.com/edesix-products, Sep. 26, 2013, Date Posted: Unknown, pp. 1-3.
GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.
Isaw Advance Hull HD EXtreme, www.isawcam.co.kr, Sep. 26, 2013, Date Posted: Unknown, p. 1.
Kustom Signals VieVu, http://www.kustomsignals.com/index.php/mvideo/vievu, Sep. 26, 2013, Date Posted: Unknown, pp. 1-4.
Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.
Looxcie Wearable & mountable streaming video cams, http://www.looxcie.com/overview?gclid=CPbDyv6piq8CFWeFQAodlhXC-w, Sep. 26, 2013, Date Posted: Unkown, pp. 1-4.
Midland XTC HD Video Camera, http://midlandradio.com/Company/xtc100-signup, September 26, 2013, Date Posted: Unknown, pp. 1-3.
Panasonic Handheld AVCCAM HD Recorder/Player, http://www.panasonic.com/business/provideo/ag-hmr10.asp, Sep. 26, 2013, Date Posted: Unknown, pp. 1-2.
Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.

Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Invalidity Chart for International Publication No. WO2014/000161 dated Oct. 31, 2017.
PCT Patent Application PCT/US17/16383 International Search Report and Written Opinion dated May 4, 2017.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
TASER AXON Body on Officer Video/Police Body Camera, http://www.taser.com/products/on-officer-video/axon-body-on-officer-video, Sep. 23, 2013, Date Posted: Unknown, pp. 1-8.
TASER AXON Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnelco.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
VIEVU Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products/Products.html, September 26, 2013, Date Posted: Unknown, pp. 1-3.
Notification of Transmittal of the International Search Report and the Written Opinion of the International Search Authority, or the Declaration dated January 14, 2016, International Application No. PCT/US2015/056039; International Filing date October 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); U.S. D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); U.S. D. Kan, Complaint for Patent Infringement, May 27, 2016.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2016.
Petition for Inter Partes Review No. 2017-00376, *Taser International, Inc.* v. *Digital Ally, Inc.*, filed Dec. 1, 2016.
Petition for Inter Partes Review No. 2017-00515, *Taser International, Inc.* v. *Digital Ally Inc.*, filed Jan. 11, 2017.

(56) References Cited

OTHER PUBLICATIONS

Petition for Inter Partes Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
U.S. Appl. No. 15/011,132 Office Action dated Apr. 18, 2016, 19 pages.
Zepcam Wearable Video Technology, http://www.zepcam.com/product.aspx, Sep. 26, 2013, Date Posted: Unknown, pp. 1-2.
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
European Patent Application 15850436.6 Search Report dated May 4, 2018.
Final Written Decision for Inter Partes Review No. 2017-00375, *Axon Enterprise Inc.* v. *Digital Ally, Inc.*, issued Jun. 1, 2018.
Decision Denying Institution of Post Grant Review for Post Grant Review No. PGR2018-00052, *Axon Enterprise, Inc.* v. *Digital Ally, Inc.*, issued Oct. 1, 2018.
Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet: <URL:http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date p. Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231- 0-Taser-Axon-Flex-The-next-generation-of-body-camera/>, Date Posted: Mar. 12, 2012; Date Printed: Oct. 27, 2015.
Brown, TP-LINK TL-WDR3500 Wireless N600 Router Review, Mar. 6, 2013.
Controller Area Network (CAN) Overview, National Instruments White Paper, Aug. 1, 2014.
Daskam, Samuel W., Law Enforcement Armed Robbery Alarm System Utilizing Recorded Voice Addresses Via Police Radio Channels, Source: Univ. of Ky, Off of Res and Eng., Serv (UKY BU107), pp. 18-22, 1975.
*Digital Ally* vs. *Taser International, Inc.*, Case No. 2:16-cv-232 (CJM/TJ); U.S. D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.
Hankyung Auto News Article, Know-Flow Bank's Black Box for Cars "Multi-Black Box," Copyright 2005.

Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p1271.html>, Mar. 4, 2005.
Motor Magazine Article, Recreating the Scene of an Accident, published 2005.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4
Asian Wolf High Quality Angel Eye Body Video Spy Camera Recorder System, http://www.asianwolf.com/convert-bodycam-hq-angeleye.html, Sep. 26, 2013, Date Posted: Unknown, pp. 1-3.
Brick House Security Body Worn Cameras / Hidden Cameras / Covert Spy Cameras, http://www.brickhousesecurity.com/body-worn-covert-spy-cameras.html?sf=0#sortblock&CMPID=PD_Google_%22body+camera%22&utm_source=google&utm_medium=cpc&utm_term=%22body+camera%22&mm_campaign=876a94ea5dd198a8c5dc3d1e67eccb34&keyword=%22body+camera%22&utm_source=google&utm_medium=cpc&utm_campaign=Cameas+-+Body+Worn+Cameras&c1=323-29840300-11-t14536730-10363-12601-3009263&gclid=CPiBq7mliq8CFSWFQAodGlsW8g&ad=7592872943 retrieved on September 26, 2013.
Amazon.com wearable camcorders, http://www.amazon.com/s/ref=nb_sb_i_0_4?url=search-alias%3Dphoto&field-keywords=wearable+camcorder&x=0&y=sprefix=wear, Sep. 26, 2013, Date Poster: Unknown, pp. 1-4.
Notification of Transmittal of the International Search Report and the Written Opinion fo the International Searching Authority, or the Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company, Copyright 2005.
City of Pomona Request for Proposals for Mobile Video Recording System for Police Vehicles, dated prior to Apr. 4, 2013.
http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.gianffreakinrobot.com/sci/coming-3d-projectors-transmit-holograms-cell-phone.html>.

(56) References Cited

OTHER PUBLICATIONS

Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-camera-video-recorder.html?gclid=CIKohcX05rkCFSIo7AodU0IA0g&ef_id=UjCGEAAAAWGEjrQF:20130925155534:s, Sep. 25, 2013, Date Posted: Unknown, pp. 1-4.
Drift X170, http://driftinnovation.com/support/firmware-update/x170/, Sep. 26, 2013, Date Posted: Unknown, p. 1.

* cited by examiner

MULTI-FUNCTIONAL REMOTE MONITORING SYSTEM

RELATED APPLICATION

This application is a continuation patent application of U.S. patent application Ser. No. 13/959,142, filed Aug. 5, 2013 which is a U.S. continuation patent application of U.S. patent application Ser. No. 12/609,811, filed Oct. 30, 2009, now U.S. Pat. No. 8,503,972, which is a non-provisional patent application claiming priority benefit of U.S. Provisional Patent Application No. 61/109,858, filed Oct. 30, 2008, the disclosures of which are hereby incorporated by reference into the present application in their entirety.

The following U.S. patent applications are also incorporated by reference into the present application in their entirety (although no priority benefit is claimed): U.S. patent application Ser. No. 11/531,955, filed Sep. 14, 2006, and entitled "Rear View Mirror With Integrated Video System"; and U.S. patent application Ser. No. 12/189,192, filed Aug. 10, 2008, and entitled "Vehicle-Mounted Video System with Distributed Processing."

FIELD

The present invention is directed to monitoring and surveillance systems. More particularly, the present invention is directed to a multi-functional remote monitoring system for use as an evidence gathering tool in a mobile video surveillance system.

BACKGROUND

In the law enforcement setting, it is often desirable to record or otherwise document events surrounding the law enforcement vehicle and officer. Many law enforcement vehicles now include video systems for recording and displaying activity in and around the vehicle. The video systems are mounted in the vehicle and are operable to record and store video signals in an onboard memory. Immediate storage is desirable so as to document and forensically capture the events within and around the vehicle.

More recently, law enforcement officers have begun recording audio signals when the officer leaves the vehicle, such as during a traffic stop. The officer wears a small, wireless microphone on the officer's person. The wireless microphone is then operable to, in real time, transmit the audio signals to a base station located in the vehicle, such as a transceiver including onboard memory. In some systems, the transceiver is stored in the video system, and in other systems, it is a separate device located in the vehicle. Some base stations are operable to send control signals to the wireless microphone, and, as noted above, to receive audio signals, in the form of radio signals, from the wireless microphone.

The base stations are configured to provide a charging socket for the wireless microphone, an antenna for communicating with the microphone, connectors for inputting control lines and power to the microphone, and output lines for the audio signals received from the microphone. Although the base station is operable to receive from the microphone audio signals and record the signals in the base station's onboard memory, the base station is typically limited to only this functionality. If the law enforcement officer travels outside the range of the base station's transceiver, then any audio signals recorded by the microphone are not stored and are lost. This is extremely unfortunate in situations where crucial evidence is lost.

Accordingly, there is a need for a remote monitoring system that includes a wireless microphone operable to allow a user, such as a law enforcement officer, to travel outside a transmit range of a base station, such as the officer's vehicle, without fear of losing evidence recorded by the microphone. Additionally, there is a need for a multi-functional remote monitoring system having a remote monitoring transmitter operable to record numerous types of data, such as audio signals, video signals, still images, and other data, and selectively store the recorded data in an onboard memory and then transmit the data to a base station when the officer is within a transmit range. There is also a need for a multi-functional remote monitoring system operable to assist the user in performing his/her law enforcement duties when away from the officer's vehicle, so that the officer need not return to the vehicle to perform routine duties, such as verifying the authenticity of a driver's license and obtaining information for a holder of the license. Finally, there is need for a multi-functional remote monitoring system that presents full, bi-directional capabilities by allowing both the transmission and receipt of both audio and data signals from the remote monitoring transmitter and to the base station.

SUMMARY

The present invention comprises a multi-functional remote monitoring system for use in a mobile surveillance system. The remote monitoring system includes a host controller, a hub transceiver, and at least one remote monitoring transmitter operable to capture and transmit data to/from the host controller, the hub transceiver, and other remote monitoring transmitters. The hub transceiver and the remote monitoring transmitter are adapted for bi-directional transmission and receipt of audio and data signals.

The present invention further provides a multi-functional remote monitoring and surveillance system for use in a mobile video surveillance system that is a true evidence gathering tool. A single hub transceiver (such as, for example, an in-car transceiver ("ICT") and antenna) is capable of operating with multiple remote monitoring transmitters ("RMTs"). Each RMT is operable to send and receive audio and data signals to/from the hub transceiver. The host controller is operable to control the hub transceiver, and in embodiments of the present invention, the RMTs, and facilitate communication of the audio and data signals between the RMTs and the hub transceiver. A plurality of components is included in the RMT to assist in acquiring, storing, and transmitting audio and data signals.

In one embodiment of the present invention, the RMT is wireless and includes a microphone, a speaker, a microprocessor, and an onboard memory. The RMT is operable to record digital audio signals surrounding the RMT and to receive audio signals that can then be broadcast on the speaker. When the RMT is in transmit range of the hub transceiver, which is located in a vehicle, for example, the RMT transmits the recorded audio signals to the hub transceiver in real time, or substantially real time, for storage in a memory of the hub transceiver. However, when the RMT is outside of transmit range of the hub transceiver, the RMT stores the recorded audio signals in the onboard memory of the RMT. When the RMT determines it is within transmit range of the hub transceiver, the RMT then transmits the audio signals to the hub transceiver for storage in its memory.

Additionally, because the RMT can transmit signals to the hub transceiver it is assigned to, referred to as the native hub transceiver, and other hub transceivers and RMTs, the RMT can advantageously determine an optimal transmit path that saves power and ensures that the recorded audio signals are transmitted and stored in a secure memory.

In other embodiments of the present invention, the RMT includes components in addition to the microphone and speaker for recording other types of data, such as an integrated global positioning system ("GPS") transceiver connected to a GPS antenna and a display. The GPS transceiver allows the RMT to display and transmit to the hub transceiver its GPS location.

In another aspect of the present invention, the system calculates an optimum power usage for transmitting and receiving data based upon the location, determined via the respective GPS transceiver, of one or more RMTs in relation to the hub transceiver or in relation to other RMTs. Alternatively, the system calculates an optimum power usage by generally continuously, or at least frequently, monitoring signal strength levels and communicating such level between the RMT and the hub transceiver.

In even further embodiments of the present invention, the RMT includes one or more sensors, readers, or other components for obtaining biometric and/or biological data, such as a fingerprint reader for obtaining fingerprint data. The RMT can then transmit the biometric and/or biological data to the hub transceiver for further processing and/or analysis.

In another embodiment of the present invention, the RMT includes a still-shot or video subsystem for capturing images and video and transmitting back to the hub transceiver for identification, analysis, or other processing. The image may be, for example, a person's face or a driver's license, or any other image desired by a user of the present system to be transmitted back to the hub transceiver.

In one aspect of the invention, the RMT includes a feature to assist in determining the authenticity of a driver's license. In one embodiment, an ultraviolet ("UV") light-emitting diode ("LED") illuminator is included for visualizing fluorescent or UV-dependent markings on a driver's license that are invisible under normal light. In another embodiment of the present invention, an infrared ("IR") LED may be provided.

Each RMT or hub transceiver is operable to function as a node or router/repeater to allow the RMTs and hub transceivers to act as a mesh network, which extends the range of the system and provides additional capabilities. When necessary or desirable, each RMT may itself function as a hub transceiver with respect to other RMTs of the present system.

An Emergency/Officer Down mode, in one embodiment, allows the RMT to scan all channels to find any available hub transceiver beacon signal if it is unable to find its own hub transceiver.

These and other features of the present invention are described in greater detail below.

BRIEF DESCRIPTION OF THE DRAWING FIGURES

The present invention is described herein with reference to the following drawing figures.

Figure 1:
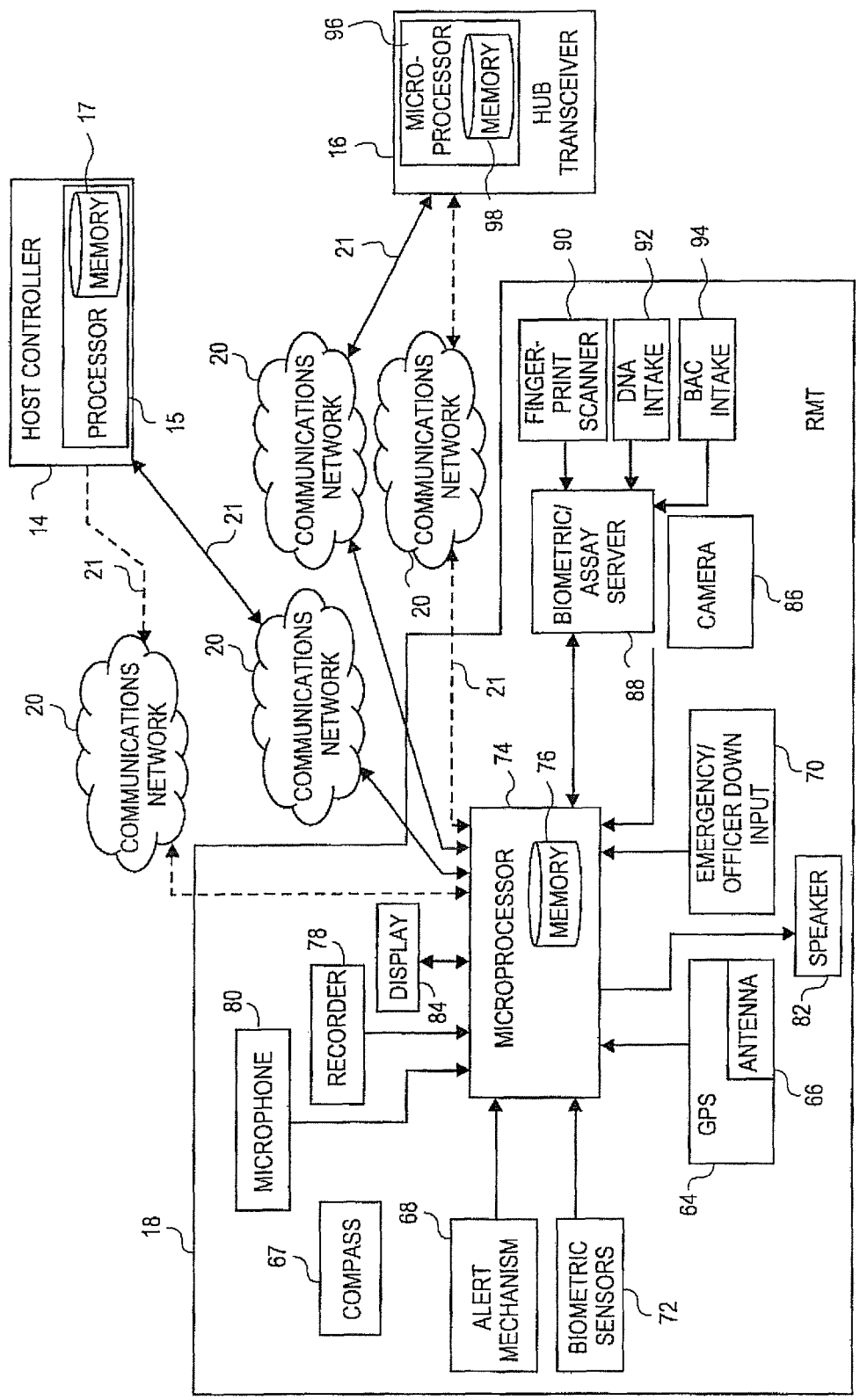
FIG. 1 is a block diagram of a remote monitoring system of embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE INVENTION

With reference to the figures, and specifically FIG. 1, a multi-functional remote monitoring system 10 is described and illustrated in accordance with embodiments of the present invention. Embodiments of the present invention provide the multi-functional remote monitoring system 10 for use in an in-car or other fixed or mobile video surveillance system 12 that is capable of being used as an evidence gathering tool. The remote monitoring system 10 broadly comprises a host controller 14, at least one hub transceiver 16 in communication with and operable to be controlled by the host controller 14, and at least one remote monitoring transmitter ("RMT") 18 in communication with and operable to be controlled by either or both of the host controller 14 and the at least one hub transceiver 16.

The RMT 18 of the system 10 allows for remotely capturing, storing, transmitting, and receiving audio and data signals, including, for example and without limitation, GPS location, audio data, time and date data, biometric or biological data, images and video, text messages, and metadata. The system 10 is operable to wirelessly transmit data among the host controller 14, the hub transceiver 16, and the at least one RMT 18 via a communications network 20, such as the Internet, a Wi-Fi link, or a radio-frequency ("RF") link, or directly via a manual connection 21, such as a universal serial bus ("USB"), an Ethernet port, or an SD card.

Additionally, the RMT 18 is capable of bi-directional audio and data transmission with the hub transceiver 16. In embodiments of the present invention where the hub transceiver 16 is provided in a vehicle, for example, the bi-directional functionality allows the user, such as a police officer inside the vehicle, to signal or communicate with at least one other officer outside the vehicle with either audio or data transmissions.

The system 10 further includes a computer program for implementing the various aspects of the invention. Portions of the computer program stored on memories of the hub transceiver 16 and RMT 18 can be updated in the field via the communications network 20 or manual connection 21.

Video Surveillance System

Figure 2:
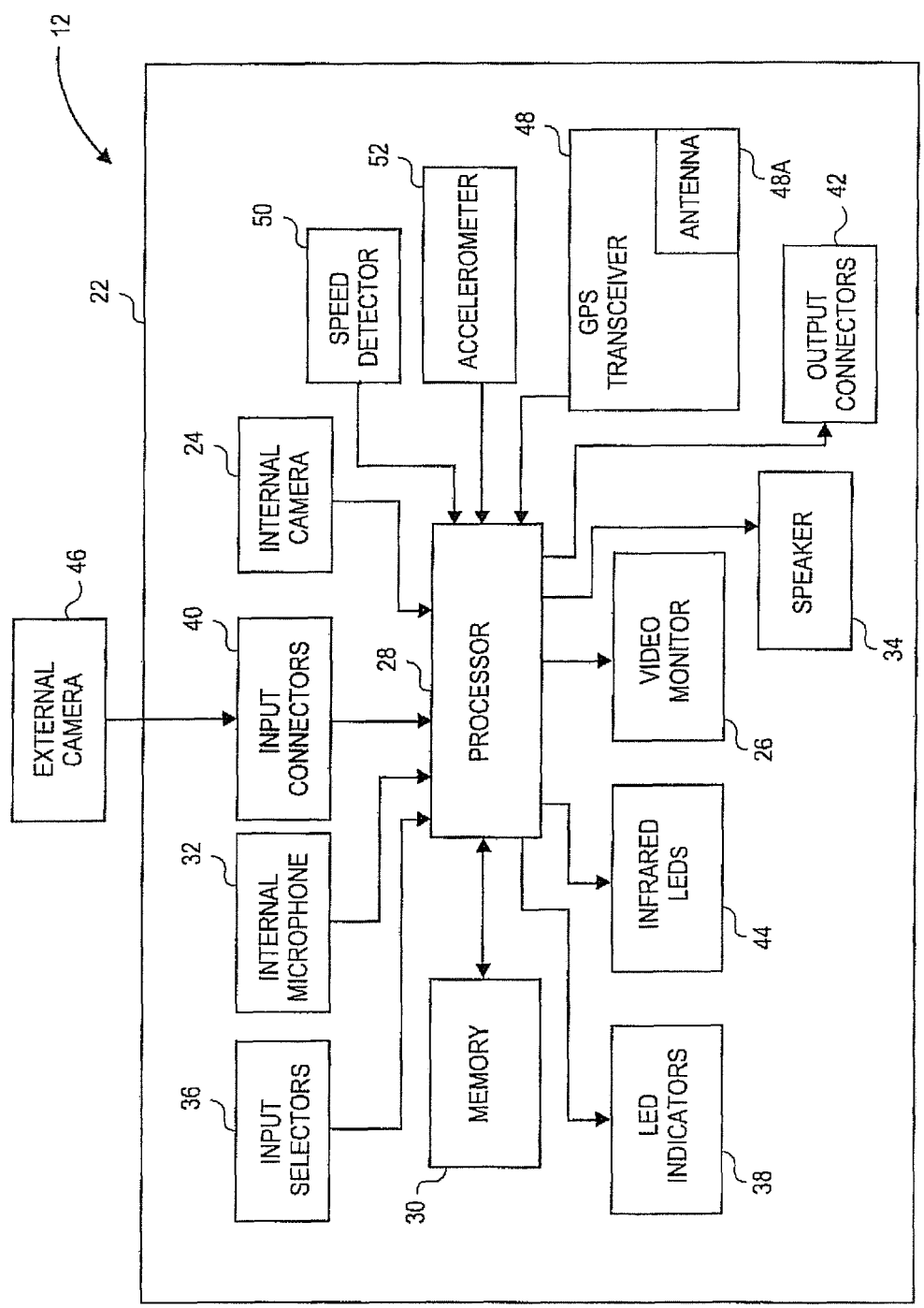
FIG. 2 is a block diagram of a vehicle surveillance system for use with the remote monitoring system of embodiments of the present invention.
Figure 3:
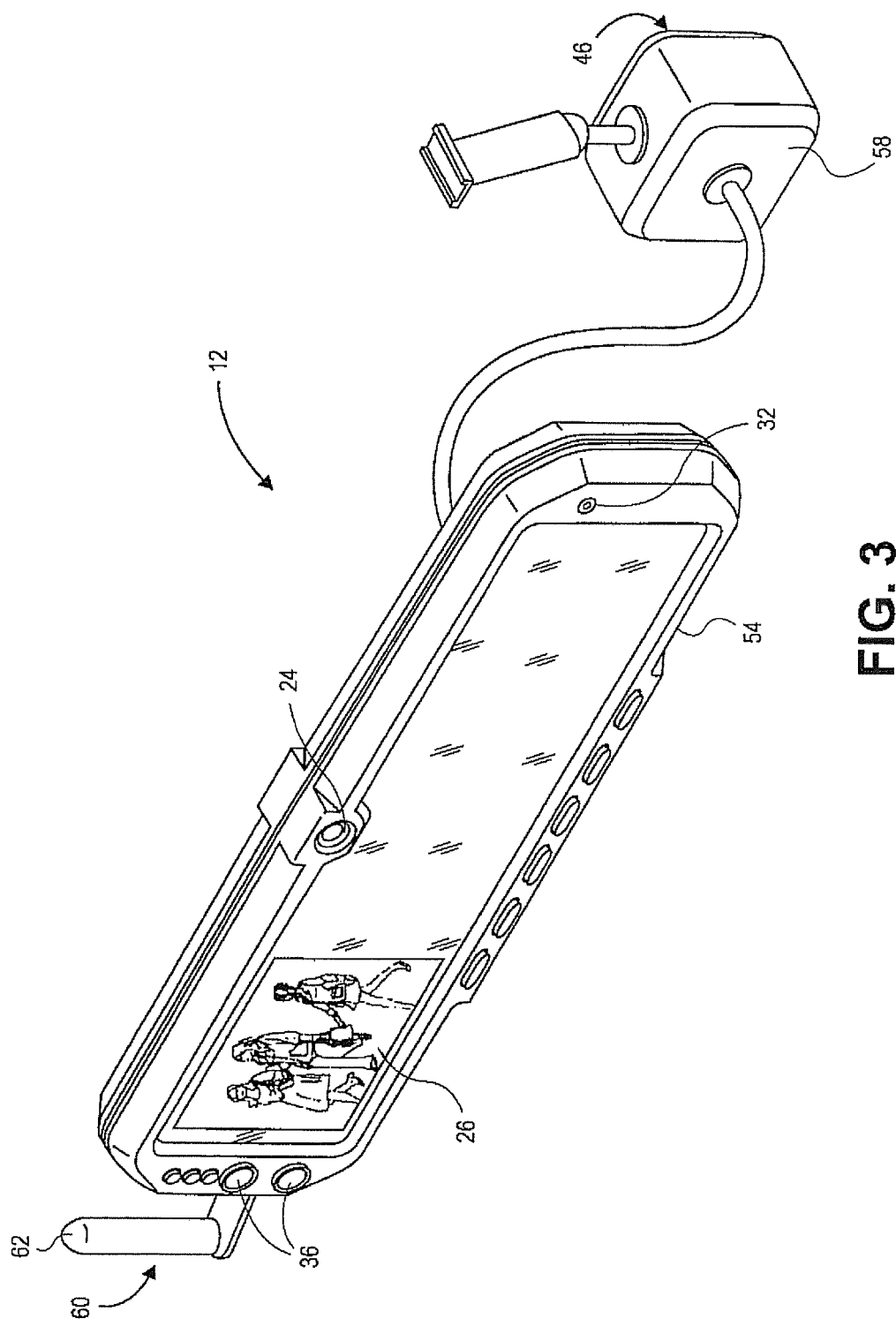
FIG. 3 is a perspective view of the vehicle surveillance system mounted in a rearview mirror of a vehicle.

Before turning to the details of the present invention, a context is provided in the form of a brief description of an exemplary video surveillance system 12 suitable for use with the present invention. Such a system 12 is shown in FIGS. 2 and 3, discussed in more detail below, and further described in the '955 and '192 patent applications noted above. Both of the referenced patent applications are assigned to Digital Ally, Inc., the assignee of the present application, and are hereby incorporated by reference in their entirety. The video surveillance system 12 described below is intended to be exemplary and not limiting of the present invention.

Referring to FIG. 2, an embodiment of an in-car video surveillance system 12 adaptable for use with the embodiments of present invention broadly comprises a housing 22, an internal camera 24, a video monitor or display 26, a processor or electronics module 28, a memory 30, an internal microphone 32, a speaker 34, input selectors 36, LED indicators 38, input connectors 40, output connectors 42, and at least one infrared LED 44. The system 20 may also include at least one external camera 46, a GPS transceiver 48 with a GPS antenna 48*a*, a speed detector 50, and an accelerometer 52.

In embodiments of the present invention, the housing 22 of the video surveillance system is a rearview mounted mirror housing 54, as illustrated in FIG. 3. The components of the system 20 are operable to be housed within the mirror housing 54 so as to present a fully integrated video surveillance system 20 in the mirror housing 54. The mirror housing 54 replaces a standard rearview mounted mirror and as such, includes a mirror 56.

The internal camera 24 is typically positioned on an upper and central portion of the mirror housing 54 so that it can capture video images of activity within the passenger compartment of the vehicle. Alternatively, the internal camera 24 may be hidden behind the mirror 56. The internal camera 24 may be mounted so as to view both forward and rearward of the camera 24. Additionally, the camera 24 may be mounted at an appropriate angle, such as approximately 10.degree.-20.degree. to the left of vertical, so that the camera 24 is able to properly view the passenger compartment even when the mirror 56 is angled towards the driver during normal use. Camera 24 may also be mounted at approximately 160.degree. or greater when camera 24 is a wide-angle camera. In embodiments of the present invention, two or more cameras 24 are housed within housing 22. One appropriate internal camera 24 is a 510.times.492 black and white CMOS sensor with TV resolution, 0.01 Lux sensitivity, and a 140.degree. 4-element coated glass lens.

The external camera 46 may be mounted outside of the mirror housing 54 in a separate, external camera enclosure 58. The external camera 46 is useful to record, for example and without limitation, video images when a user, such as a police officer, leaves the vehicle, such as during a traffic stop. More than one external camera (not shown) may be employed. For example, a second external camera may be employed to record events occurring at a rear of the vehicle. An exemplary external camera 46 is a color CCD sensor NTSC with 768.times.484 pixels and 470 lines of resolution, a 10.times. optical zoom and auto focus capabilities, a wide viewing angle, and standard and low light modes. In embodiments of the present invention, no external camera 46 is employed, and instead, the internal camera 30 is operable to record video images external to the vehicle.

The monitor or display 26 may be mounted substantially behind the mirror 56 and operate in conjunction with the mirror 56 so that when the monitor 26 is turned on, it is viewable through the mirror 26, and when it is turned off, it is not visible. The monitor 26 may be operable to automatically turn off when the vehicle begins to move or when the vehicle's transmission is shifted into reverse or drive, so that the vehicle's driver has full use of the mirror 56 while the vehicle is in motion. Alternatively, the monitor 15 may be mounted adjacent to or only partially behind the mirror 56. One appropriate monitor 26 is a 3.5 inch diagonal, 640.times.480 TFT LCD monitor.

The processor or electronics module 28 is operable to receive and transmit data and instructions from and to the host controller 14. In particular and without limitation, the processor 28 is operable to receive video signals from the video cameras 24,46 and selectively transmit the signals to the monitor 26, to the host controller 14, and to the memory 30. The processor 28 also includes components operable to receive and execute instructions stored in the memory 30. In embodiments of the present invention, these instructions include menu instructions for setting operational modes and resolutions. These instructions may be updated by loading instructions into a memory card and then inserting that card into a port (not shown) in the system 12 or via the communications network 20 or manual connection 21.

The input and output connectors 40,42 are operable to receive the manual connection 21 and other transmitters for receiving and transmitting data to the system 12 and receiving power. For example and without limitation, the input and output connectors 40,42 may be employed to directly access the memory 30 using a laptop or other computer. The input connectors 40 may include, for example, a connector for power. In embodiments of the present invention where the GPS transceiver 48, the speed detector 50, and the accelerometer 52 are external to the mirror housing 54, one or more input connectors 40 may be employed to electronically connect the transceiver 48, the detector 50, and the accelerometer 52 to the processor 28 and memory 30.

The input connectors 40 may also be coupled with one or more activators (not shown) for transmitting and/or receiving signals, as applicable, to activate operation of the system 12. These activators may include, for example, turning on the vehicle's siren and/or signal lights. The input connectors 40 may also receive an output of the external camera 46 and an output of an external microphone. The output connectors 42 may include, for example, an audio/visual connector for transmitting audio/visual signals to an external monitor or recording device, or to remote wireless microphones discussed in more detail below. Input and output connectors 40,42 may be a port, such as a USB, Ethernet port, or an SD card.

Additionally or alternatively, any one or more of the connectors 40,42 may be replaced with wireless communication technology, which would allow the system 12 to wirelessly receive or transmit any of the aforementioned inputs or outputs. In one embodiment, the input and output connectors 40,42 are provided on an interface module or block (not shown) that is not located on or integrated into the housing 22 but rather is located in a remote location, such as under the vehicle's dash, and operatively coupled with the system 12 by wire or wirelessly. In alternative embodiments of the present invention, the input and output connectors 40,42 are the same connector.

The video surveillance system 12 may also include components for receiving audio signals from audio sources, such as the internal microphone 32, and for transmitting audio signals to the speaker 34. The system 12 may also include components for receiving wireless signals from one or more remote microphones, such as a microphone included with the RMT 18 worn or carried by the user, as discussed in more detail below. In this instance, the system 12 includes, in one embodiment, an integrated 900 MHz (or another suitable frequency allowed by law) spread spectrum, dual receiver capable remote microphone system with a nominal range of up to approximately 1000 feet or greater (a range of several miles may be achieved under the proper conditions).

The system 12 may also include an integrated GPS transceiver 48 connected to the GPS antenna 48a. Utilizing the information provided by the GPS transceiver 48, the system 12 may mark recorded video with real-time position data. The system 12 may further include a "dead reckoning" function that operates in conjunction with the GPS transceiver 48 to allow for operation in shielded locations, such as underground garages.

In embodiments of the present invention, the video surveillance system 12 includes an external transceiver 60 and an antenna 62 mounted to the mirror housing 54, as illustrated in FIG. 3. The antenna 62 may be in addition to or replace the GPS antenna 48a. The transceiver 60 and antenna 62 are preferably operable to assist in wirelessly communicating audio and data signals to and from the system 12 and the host controller 14.

Remote Monitoring System

Host Controller

In embodiments of the present invention, the video surveillance system 12 described above serves as the host controller 14, such that the system 12 is operable to further control the hub transceiver 16 and/or RMT 18 of the remote monitoring system 10, as described herein. In embodiments where the video surveillance system 12 also serves as the host controller 14 for the remote monitoring system 10, the processor 28, memory 30, and other components of the system 12 perform the functions of the host controller 14 described herein.

In alternative embodiments of the present invention, the host controller 14 of the remote monitoring system 10 is separate from the video surveillance system 12. In such embodiments, the host controller 14 is a computing device that includes its own processor 15 and memory 17 and is housed in a separate housing, although the host controller 14 may still be in close physical proximity to the surveillance system 12.

In even further alternative embodiments of the present invention, the host controller 14 is a computing device located at a central location, such as a law enforcement station. In such instance, the host controller 14 is not in close physical proximity to the video surveillance system 12. In such an alternative embodiment, the host controller 14 may comprise a plurality of computing devices.

Regardless of whether the host controller 14 is part of the surveillance system 12 or is separate, the host controller 14 is in communication with either or both of the at least one hub transceiver 16 and the at least one RMT 18 via the communications network 20 or manual connection 21. The host controller 14 operates or hosts the computer program and serves as a repository for transmitted data and programs used to implement certain aspects of the present invention, as described in more detail below.

The host controller 14 may be any computing device such as a network computer running Windows, Novel Netware, Unix, or any other network operating system. The host controller 14 may be connected to another computing device that serves as a firewall to prevent tampering with information stored on or accessible by the host controller 14 and to a computing device operated by an administrator of the host controller via another communications network.

The processor 15 may include microprocessors, microcontrollers, programmable intelligent computers (PICs), or the like. The processor may also include field-programmable gate arrays (FPGAs), or other programmable logic devices (PLDs), fully-custom or semi-custom application-specific integrated circuits (ASICs), or any other device that is described by one or more code segments of a hardware description language (HDL). Further, the processor 15 may include combinations of any of the components listed. It is to be specifically understood that for ease of reference, the above description of the processor 15 shall also apply to the processor 28 for the surveillance system 12, the microprocessor 74 for the RMT, and the microprocessor 96 for the hub transceiver, as discussed below.

The memory 17 generally stores transmitted audio and data signals and other information for the operation of the remote monitoring system 10. The memory 17 may include, for example, removable and non-removable memory elements such as random-access memory (RAM), read-only memory (ROM), flash, magnetic, optical, USB memory devices, and/or other conventional memory elements, such as hard-disk drives. It is to be specifically understood that for ease of reference, the above description of the memory 17 shall also apply to the memory 30 for the surveillance system 12, the memory 76 for the RMT, and the memory 98 for the hub transceiver, as discussed below.

The computer program of the present invention is stored in or on computer-readable medium residing on or accessible by the host controller 14 for instructing the host controller to operate certain steps of the present invention as described herein. The computer program preferably comprises an ordered listing of executable instructions for implementing logical functions in the host controller 14, the hub transceiver 16, and the RMT 18. Alternatively, portions of the computer program or a subset of the program, and in particular, certain code segments, can be individually stored on the hub transceiver 16 and the RMT 18 to implement certain steps of the present invention. Therefore, the discussion of the computer program herein is to be understood as all code segments, either individually or collectively, that are executed to implement the steps and features described herein.

The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

In addition to the various steps and features implemented by the computer program of the present invention described in detail below, in one embodiment of the present invention, the computer program includes a code segment for searching and retrieving stored video based solely or in combination on any of the following: user name, vehicle ID, date/time, event ID, and case and serial number. The computer program also includes a code segment for adding notes and annotations to videos, including video frames, and images, such as a particular criminal offense, a driver's license number, a ticket number, and comments. The computer program also includes code segments for general archiving and management of recorded data.

Hub Transceiver

As used herein, the term "hub transceiver" refers to any hub for one or more RMTs 16, as described below. The hub transceiver 16 of the present invention may be, for example, an in-car transceiver ("ICT") and an antenna and include a microprocessor 96, a memory 98, and a location-determining device, such as a GPS transceiver and antenna. The hub transceiver 16 includes firmware and/or software operable to execute instructions and process data received from the RMT 18.

In embodiments of the present invention, the hub transceiver 16 is housed within the housing 22 of the surveillance system 12. In alternative embodiments, the hub transceiver 16 is physically separate from, but still in close proximity to, the surveillance system 12, i.e., the hub transceiver is still located in the vehicle. In even further alternative embodiments, the hub transceiver is located in a building or other relatively secure location.

In embodiments of the present invention, the hub transceiver 16 is operable to transmit at full power at all times, regulations permitting, and is fully controlled by the host controller 14. The host controller 14 is further operable to facilitate communication of the audio and data signals between the at least one RMT 18 and the at least one hub transceiver 16. The hub transceiver 16 is preferably operable to transmit instructions, data, and other signals to one or more RMTs and/or independently control the RMTs. In embodiments of the present invention, any RMT 18 is selectively operable to serve as a hub transceiver 16 with respect to other RMTs of the system 10 in the event the hub transceiver to which the RMT should transmit and receive data (otherwise known as the native hub transceiver) is unavailable.

Remote Monitoring Transmitter ("RMT")

The RMT 18 of the remote monitoring system 10 presents a lightweight, wireless, and hand-held device that can travel with the user, such as an officer, when the user is separated from the vehicle, and therefore, the hub transceiver 16 and the video surveillance system 12. The RMT 18 includes various components, described in detail below, that allow for remote evidence gathering and surveillance.

Embodiments of the RMT 18 of the present invention include a microprocessor 74 associated with an on-board, non-volatile memory 76. The microprocessor is operable to assist in receiving and transmitting audio and data signals to and from the RMT 18. The memory 76 allows for on-board storage of audio and data information to prevent loss of valuable evidence obtained through use of the system 10 when the RMT 18 is outside of a transmit range. A wired or wireless connector, such as a USB, RF, or Wi-Fi link, enables stored information to be downloaded from the RMT 18, and further allows the computer program utilized by the RMT 18 to be updated in the field.

As noted above, the RMT 18 of embodiments of the present invention includes various components for assisting a user, such as a law enforcement officer, in performing his/her duties and in recording and storing audio and data signals in a forensically verifiable manner. In one embodiment of the present invention, the RMT 18 includes a microphone 80 and a speaker 82 for respectively recording audio signals and for receiving audio signals from another device, such as the hub transceiver 16, host controller 14, or another RMT.

The microphone 80 may be an internal microphone, an external microphone operably coupled with the RMT 18, or both. It is contemplated that in embodiments of the present invention having an RMT 18 including both internal and external microphones 80, each microphone 80 may be used individually or both microphones 80 may be used concurrently. The microphone(s) can be used in gathering of evidence or in any other communications between the officer and the hub transceiver 16 or host controller 14. Audio signals recorded by the microphone 80 could be stored directly on the memory 76 of the RMT 18, directly on the memory 98 of the hub transceiver 16, or only stored on the memory 76 of the RMT 18 when the RMT is outside of transmit range to access and store on the memory 98 of the hub transceiver 16.

The speaker 82 allows audio signals to be sent to the RMT 18 and communicated to the officer. For example, if an officer in possession of one RMT needs to relay information to an officer in possession of another RMT, the microphone/speaker combination allows the officers to communicate with each other. Further, such audio communication is recorded and stored on the RMT on-board memory 76 or is transmitted to the hub transceiver 16 if the RMT is within transmit range. Storage of audio communication is advantageous for evidentiary purposes, especially for law enforcement personnel.

The RMT 18 of embodiments of the present invention may also include a location-determining device, such as an integrated GPS transceiver 64 connected to a GPS antenna 66. The GPS transceiver 64 and antenna 66 allows the RMT to display and transmit to the hub transceiver 16 its GPS location. In alternative embodiments of the present invention, the RMT 18 includes an electronic compass subsystem 67 to assist a user in finding a direction or otherwise establishing his/her bearing when not in motion.

An alert mechanism 68 in the RMTs 18 of embodiments of the present invention provides for covert signaling of the user carrying the RMT 18 by another individual having an RMT 18, an individual present at the hub transceiver 16, and/or, if applicable, an individual at the host controller 14 of the present system 10. In embodiments of the present invention, the alert mechanism 68 is a vibrator that can be remotely powered on to covertly alert the user carrying the RMT 18.

In embodiments of the present invention, the system 10 includes an Emergency\Officer Down mode initiated by selecting an input 70. In one embodiment, selection of the Emergency/Officer Down input 70 operates to send a signal to the RMT's 18 native hub transceiver 16 to indicate a distress message. In another embodiment, selection of the input 70 allows the RMT 18 to scan all available channels to send any available hub transceiver a beacon signal in the situation where the RMT 18 is unable to communicate with its native hub transceiver 16 or where the native hub transceiver is not attended to by a user. In one embodiment of the Emergency\Officer Down mode, a digital message is transmitted to any available hub transceiver 16. Preferably, the transmission power is adjusted to a maximum level to increase the possibility of reaching an available hub transceiver. In addition to transmitting the general distress message, the RMT 18 is also operable to transmit any of a GPS location, a name or a badge number of the officer who is down or involved in the emergency, and any other pertinent data as configured by the officer. A repeating voice message providing these details may also be transmitted. In alternative embodiments of the present invention, the transmitted digital message may be encoded and then decoded by the hub transceiver 16.

The Emergency/Officer Down mode is activated, in one embodiment, by selecting the input 70 for a predetermined length of time that is longer than a normal or common activation time. The predetermined length of time is programmable to assist in the prevention of false activation of the Emergency/Officer Down mode. If the RMT 18 is equipped with biometric or other sensors, as discussed below, the RMT 18 is capable of activating the Emergency/Officer Down mode based on readings from these sensors or other programmed conditions. In such an embodiment of the present system 10, for example, biometric sensors 72 are included in the RMT 18 to monitor the user's health or stress level. Biometric measurements taken to provide information regarding the physical and/or mental state of the user may include, but are not limited to, heart rate, respiration, bleed oxygen saturation, temperature, or other physical or mental indicators. In alternative embodiments of the present invention, the Emergency/Officer Down mode is activated by pressing two inputs 70 simultaneously, such as a "Transmit" and a "Memo" button.

The RMT 18 may also include a recorder 78 that allows the user, such as the officer, to record notes and witness interviews. The recorder 78 is preferably activated via an input (not shown) on the RMT 18. Information obtained via the recorder 78 may be stored in the RMT's onboard memory 76 and later transmitted to the hub transceiver 16, the host controller 14, or other desired location. Alternatively, the information may be streamed to either of the host controller 14 and hub transceiver 16 and stored on the respective memories of the components.

The RMT 18 may also include a camera 86, preferably wide-angle, for recording still-shots or video or otherwise capturing images and video and transmitting the images or video back to the hub transceiver 16 for identification, analysis, or other uses. The images may be, for example, a suspect's face or a driver's license. The user may selectively actuate an input to begin recording of video via the camera 86, such as when approaching a suspect. Any suitable image or video may be transmitted between the hub transceiver 16 of the present system 10 and one or more RMTs 18. For example, an image of a suspect could be transmitted to the hub transceiver 16 from the host controller 14, and the hub transceiver 16 could in turn transmit to the RMT 18.

The RMT 18 is also operable to store pre-event video. For example, should the user select the input to begin recording video, the RMT 18 could be programmed to automatically store a pre-set period of video prior to the user manually instructing the RMT 18 to store the captured video. Alternatively, the RMT 18 could be programmed to capture and record all video upon activation or power-up of the RMT 18.

In an even further embodiment of the present invention, the camera 86 may be remotely coupled with the RMT 18. In such a case, the user could wear a small, discrete camera on the user's person. The images or video recorded by the camera 86 could be immediately uploaded to and stored on the memory 76 of the RMT 18.

RMTs 18 of embodiments of the present invention may also include a biometric/assay server 88 operably coupled with one or more mechanisms for receipt of biometric indicia and/or biological assays, such as breath or saliva. The mechanisms for receipt of biometric indicia and/or biological assays include, without limitation, a fingerprint scanner 90, a DNA intake 92, and a breath alcohol content ("BAC") intake 94. For example, if the RMT 18 includes the fingerprint scanner 90, the user could request a suspect to place his/her fingerprint on the scanner 90. The scanner 90 would read the fingerprint, which would be transmitted to the biometric/assay server 88, to the microprocessor 74, and eventually to either of the host controller 14 or hub transceiver 16, where it could be analyzed and identified. Other contemplated biometric indicia or biological assays for analysis and identification by the RMT include a retinal scan, iris recognition, facial recognition, blood data, voice data, DNA, and hand geometry.

The RMT 18 may also include a UV or IR LED illuminator to assist with operation of the camera 86 or as a stand-alone feature to assist in determining the authenticity of a document or ID card such as, for example, a driver's license.

In embodiments of the present invention, the RMT 18 includes a display 84, such as an LCD monitor, for playback of recorded images, as discussed in more detail below, or for providing graphical GPS information or other information, including text messages, images of suspects, and the like. The display 84 may be a touch-screen display for receiving inputs via the user's digits or via a stylus. The display could also be associated with a keyboard for inputting text or instructions.

The above-discussed components of the RMT 18 are preferably housed in a housing that can easily travel with the user. The housing is preferably less than 10 inches in width and 10 inches in length, more preferably less than 6 inches in width and 6 inches in length, and most preferably less than 4 inches in width and 4 inches in length. The housing may be worn by the user on the user's clothing or via a lanyard, for example. The housing further includes a power source, such as a rechargeable and removable battery, for powering the RMT 18.

It is specifically noted that the RMT 18 of embodiments of the present invention could include one or a combination of the above-listed features. For example, the RMT could include the GPS transceiver and associated antenna, the microphone, the Emergency/Officer Down input, and the vibrator, but exclude the display, the biometric sensors, and other components. Alternatively, the RMT 18 could include only the microphone and speaker. Therefore, it is to be understood that the RMTs of embodiments of the present invention may present different components and features depending on the preferences of the user, cost, and other parameters.

Operation of the Remote Monitoring System

Figure 4:
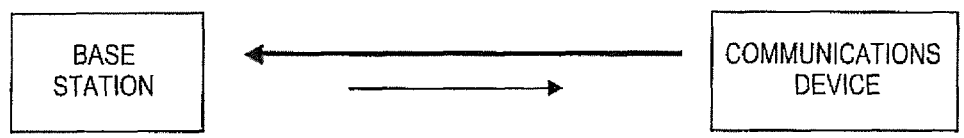
FIG. 4 is a schematic illustrating a relative amount of data transmitted between a prior art hub transceiver and remote monitoring transmitter.

As noted above, the remote monitoring system 10 is operable to transfer data between and among the host controller 14, the at least one hub transceiver 16, and the at least one RMT 18. Referring to FIG. 4, a block diagram illustrating an amount of relative data transmitted between a base station and a wireless communications device having a microphone of the prior art is provided, with the length and size of each arrow being proportional to an amount of data transmitted. As illustrated, a prior art base station may accept a relatively large amount of data from an associated communications device; in contrast, however, the base station is only operable to transmit a relatively small amount of data to the communications device. The communications device typically provides audio and control signals to the base station, whereas the base station typically sends only control signals to the communications device. Typical prior art systems allow for transfer of around 8 kbps from the communications device and to the base station, and prior art base stations typically transfer only a byte or two of information to the communications device, primarily for purposes of activation, shutdown, or synchronization.

Figure 5:
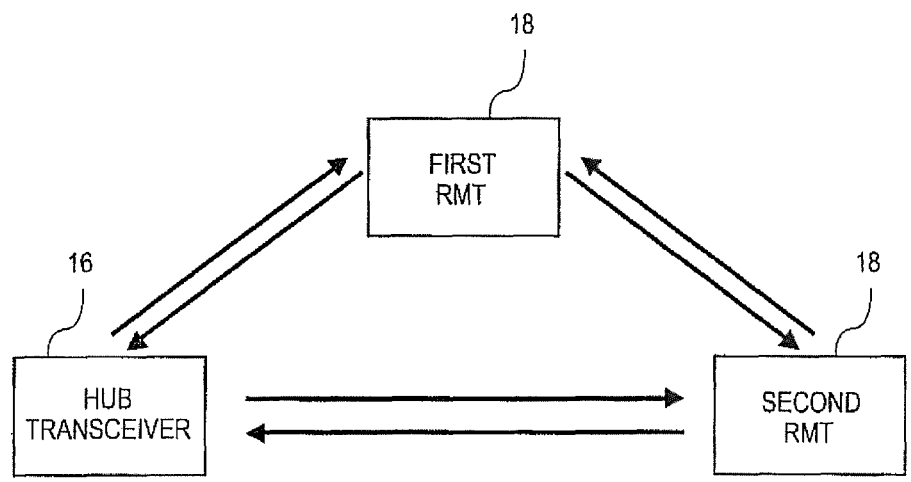
FIG. 5 is a schematic illustrating a relative amount of data transmitted between a hub transceiver and a remote monitoring transmitter of embodiments of the present invention.

In contrast to the above-described base station and communications device, embodiments of the present invention present the hub transceiver 16 and RMT 18 that are each operable to transmit to and receive from the other approximately the same amount of data, as illustrated in FIG. 5. In particular, the RMT 18 is operable to transmit data to the hub transceiver 16 at approximately 9-20 kilobits per second (kbps) and more preferably at least approximately 11 kbps, and similarly, the hub transceiver 16 is operable to transmit data to the RMT at approximately 9-20 kbps and more preferably at least approximately 11 kbps. The remote monitoring system 10 may transfer data among the host controller 14, the hub transceiver 16, and the RMT 18 at a transfer data rate of approximately 35-80 kbps and more preferably at least approximately 43 kbps. Thus, the remote monitoring system 10 of embodiments of the present invention is operable to transfer a significantly larger amount of data between and among the various components of the system 10. Additionally, this data may be of any type, and the data type may be unspecified, whereas prior art systems are limited to audio and control data. The system 10 of embodiments of the present invention thus provides bi-directional communication of all data between the hub transceiver 16 and one or more RMTs 18, as well as between individual RMTs 18. Bi-directional transmission of data allows for all data collected by the RMT 18 to be transmitted to either or both of the hub transceiver 16 and host controller 14, and vice-versa. In various embodiments of the present system 10, the data transmitted may be, but are not limited to, any of the following: system settings, time and date, audio signals, GPS location, and associated metadata.

In addition to the system 10 providing fully digital, bi-directional transmission of audio and data, embodiments of the present invention also include true frequency hopping operation, wherein the system 10 uses full power and conforms to the regulations of an appropriate governing body (e.g., the FCC or a regulatory body in the EU) for frequency hopping. In contrast, prior art systems use a smart number of channels or make use of modified hopping schemes that dwell longer on each channel. Thus, the present remote monitoring system 10 is less susceptible to interference, and less likely to cause interference, than systems not utilizing a "true" frequency hopping approach.

In embodiments of the present invention, the frequency hopping functionality of the system 10 is enhanced by the system's ability to perform a "Site Analysis" to determine the best hopping channels. The Site Analysis is largely dependent on alternate channels selected as part of a synchronization process. During the synchronization process, a number of substitute channels are generated by a hub transceiver security code seed. Alternate channel options are available for the hop sequence and can be switched in or out from the sequence as they become busy during active hopping or in a hub transceiver beacon mode. A command transmitted from either the hub transceiver 16 or the RMT 18 notifies the transceiver 16 that one of the channels has been switched to an alternate channel, while still transmitting audio packets on the current channel. The channels are determinable from the security code seed values so that an RMT 18 coming into range is able to determine whether it is currently, or will be, receiving signals on the alternate channel.

In even further embodiments of the present invention, ambient, environmental, or other background noise can be compensated for in recorded audio data. The RMT 18 preferably includes a selectable and programmable digital noise reducer that allows a user to select from among multiple settings for various ambient or environmental conditions. For example, the recorded audio data is digitized using a codec that digitally encodes audio data derived from one or more RMT's 18 internal or external microphones 80, or via some other input to the RMT 18. This process compresses the data for more efficient use of transmission bandwidth and less internal storage space and also filters the data for unwanted sounds or noise. In one embodiment, for example, a Speex codec is used. The codec runs on the microprocessor 74 in the RMT 18 or the hub transceiver 16, and is used for audio encoding and decoding. The encoding and decoding software can be configured to ignore certain sounds or frequencies, emphasize certain sounds or frequencies, or detect specific noises, such as gun shots. In embodiments of the present invention adapted to identify the sound of gun shots, the presence of one or more gun shots may also be used to activate the Emergency/Officer Down mode to the hub transceiver 16 or other RMT 18 of the present system 10.

The system 10 allows for the RMT 18 to transmit to a foreign hub transceiver 16 when the hub transceiver 16 the RMT 18 is supposed to transmit to (the native transceiver) is outside a transmit range or otherwise unavailable. In more detail, a security code embedded in every transmission contains seed values for generating a pseudo-random hop sequence and hop channels, allowing the RMT 18 to synchronize with the foreign hub transceiver's hop sequence and signal for help if the preferred or native RMT channel is unavailable. The RMT 18 periodically transmits back to the hub transceiver 16 during a standby/linked mode so the hub transceiver 16 knows if the RMT 18 is in the transmit range. If the RMT 18 is outside of the transmit range, the RMT 18 first tries to transmit data (or enter Emergency/Officer Down mode if sending a distress signal) on its native channels, assuming it is already linked to a hub transceiver 16. If it is not linked to a hub transceiver 16 or does not receive a response from a hub transceiver 16, the RMT 18 begins scanning a list of channels available for any hub transceiver 16 and security code programmed in the RMT 18. This is a priority scan that alternates with the RMT's own hop list channels. If the RMT 18 detects a foreign hub transceiver security code, the RMT 18 uses the security code as a seed for the hop list generator. The RMT 18 immediately knows where in the hop sequence it is, based upon the channel on which the security code was received. The RMT 18 will temporarily operate as an available RMT for the foreign hub transceiver 16, sending identification data packets to let the foreign hub transceiver know it is a visitor RMT transmitting data or sending a distress signal. If the foreign hub transceiver 16 acknowledges the RMT data, the RMT 18 will maintain the hopping sequence until the session is ended by either the RMT 18 or the foreign hub transceiver 16. The RMT 18 returns to its regular hop sequence after the session with the foreign hub transceiver 16 ends. If the session ends prematurely, the RMT 18 resumes searching for any available hub transceiver 16.

When an RMT 18 of the present system 10 is in a power-down mode due to inactivity or for any other reason, it is contemplated that depression or activation of any input can bring the RMT 18 out of power-down mode. Although a specific input may be designated for this task, it is preferred that any depressed input serve this function in order to quickly and more efficiently bring the RMT out of power-down mode when needed.

The RMT 18 of embodiments of the present invention is further operable to transmit its location, detected via the GPS transceiver 64, to the hub transceiver 18, the host controller 14, another RMT 18, or other device in a vehicle for display of the RMT's location on a map, including in relation to a location of the vehicle or the other RMT 18. In some embodiments of the present system 10, the GPS information is always transmitted through the hub transceiver 16 prior to being transmitted to the other RMT 18. Dead reckoning and time-of-flight can be used, in one embodiment, to calculate a predicted location of an RMT 18 if the GPS signal from that RMT is lost. Further, a similar calculation can be utilized to provide the user with a predicted location of a hub transceiver 16 if the RMT loses communication with the hub transceiver. The RMT 18 can also transmit voice directions between the hub transceiver 16 and one or more RMTs 18, or between individual RMTs, in order to guide the user to a desired location. The voice directions may be electronically generated by the RMT 18 or other component of the present system. Information is preferably provided to the user via a speaker 82, which in alternative embodiments may be coupled with an ear piece.

As noted above, data can be received from and transmitted to the RMT 18 and any combination of another RMT, the hub transceiver 16, and the host controller 14. Data can be transmitted wirelessly via the Internet, a Wi-Fi link, and/or a radio frequency link. Alternatively or in addition, each RMT 18 and hub transceiver 16 includes a USB port, an Ethernet port, an SD card, or other suitable connector for transferring data manually. RMT and hub transceiver firmware can, in various embodiments, be updated via direct connection, such as USB, J-TAG, and other suitable connections, or by radio link. Data bit rate can be changed in any embodiment of the present system 10 to increase the range of the various components of the present system. Further, software used by any components of the present system 10 may be updatable in the field via Wi-Fi, RF, or other wireless communication methods, or via a wired connection to other components of the present system.

The system 10 may include a substantially automatically adjustable transmit power output of up to approximately 1 W for improved performance and greater range, even in less than ideal conditions, whereby a GPS location may be factored into power adjustment calculations. In one example of the RMT 18 including an automatically adjustable power output, the hub transceiver 16 may periodically broadcast a signal providing, along with other information, its GPS location. Any RMT 18 receiving such information from the hub transceiver 16 compares its own GPS location to that of the hub transceiver 16. Based on the compared locations of the hub transceiver 16 and the RMT 18, the RMT 18 can then calculate the optimum power level at which to transmit data, thereby maximizing efficiency of power usage. The calculations can also be carried out by the hub transceiver 16 or the host controller 14 to take advantage of greater processor power or other features. A power setting based on the calculated information can then be transmitted to the RMT 18.

Alternatively, power in the RMT 18 may be incrementally increased until communication is established with the closest hub transceiver 16, such that the RMT 18 is using the minimal amount of power necessary to communicate with the hub transceiver 16. An even further but related alternative is to generally continuously, or at least frequently, such as every 2-20 seconds, monitor the signal strength levels between an RMT and a hub transceiver or another RMT. The signal strength levels would then be communicated to the other of the RMT and the hub transceiver so as to maximize power output.

Other features, such as factoring into the power settings the nature of the terrain or the presence of structures, could also be incorporated. RMTs 18 or the hub transceiver 16 of embodiments of the present invention can, for example, include a topographic GPS map. This map may be downloaded in the field or may be provided to the RMT 18 prior to use in the field. The topographical information relating to the area in which the RMT 18 is being used may be included in the optimum power calculation. Likewise, the presence of buildings or other structures, and even the material components of those structures, such as stone or steel, may be provided to the RMT 18 or the hub transceiver 16 and utilized to calculate optimum power levels. The GPS functionality of the present system 10 can also be used by various components of the system 10 to obtain accurate time information.

Embodiments of the present invention may also optimize power usage as well as data transfer speeds through the use of time or frequency division. By allocating bandwidth to various components of the system 10 over time, the hub transceiver 16 of the present system 10 is able to maximize the throughput of data. Similarly, data transmitted from the hub transceiver 16 may be on one set of frequencies, whereas data transmitted from the RMTs 18 may be on another set of frequencies. This serves to effectively increase the bandwidth of the system 10 as a whole. Further, the hub transceiver 16 may be associated with a single controller (not shown) that is configured to control two or more RMTs 18, each on a different frequency. Multiple controllers would then be controlled by the host controller 14.

Another embodiment of the present system 10 includes multi-frequency capability for use in different countries, accomplished by installing components for the proper frequencies. For example, use of the present system 10 in various countries may require hub transceiver antennas and RMT antennas adapted for use in those countries. Further, components in the radio frequency filtering circuits may also vary from country to country, as may frequency crystals or oscillators.

The RMTs 18 and hub transceiver 16 of the present invention are also able, in some embodiments, to spool any data acquired during operation of the respective device to local, onboard memory. Thus, if the RMT 18, for example, is out of communication with the hub transceiver 16 at any time, due to geographic reasons, for example, or because of obstructions between the RMT 18 and hub transceiver 16, the data being collected by the RMT 18 is not lost, but can be retrieved later, either when the RMT 18 is back in range of the hub transceiver 16, or via a later wired connection.

Each RMT 18 or hub transceiver 16 is operable as a node or router/repeater to allow the RMTs and hub transceiver to act as a mesh network, extending the range and providing additional capabilities. Thus, the hub transceiver 16, for example, can communicate with the RMT 18, and the RMT 18 can in turn communicate with a second RMT or a second hub transceiver. In addition to allowing an increased range for transmitting data, the mesh network allows communications to transmit around obstacles as would be desirable, for example, in an underground garage. This feature also assists in individual RMTs in the network communicating with each other or transmitting data from one RMT to another. An advantageous use of the mesh network is the provision of additional routes and increased distances for transmitting data or signals, such as an Emergency/Officer Down signal. Any bi-directional repeater would preferably include at least two transmitting and two receiving ports and preferably three transmitting and three receiving ports.

Although the invention has been disclosed with reference to various particular embodiments, it is understood that equivalents may be employed and substitutions made herein without departing from the scope of the invention as recited in the claims.

The invention claimed is:

1. A remote monitoring system for use by law enforcement personnel, the remote monitoring system comprising:
   at least one remote monitoring transmitter having a processor, an on-board memory, and an input device for capturing input data and configured to be worn by a law enforcement officer,
   said remote monitoring transmitter configured with a biometric sensor for detecting information indicative of a mental state of a user,
   said remote monitoring transmitter further configured for determining a condition of the user based at least in part on the information indicative of the mental state of the user and further configured for sending an emergency signal adjusted to a maximum transmission power level based on the condition of the user,
   at least one hub transceiver in bi-directional communication with said at least one remote monitoring transmitter, said hub transceiver having a processor and a memory and being associated with a law enforcement vehicle,
   said system being configured to transmit at least a portion of the captured input data to the hub transceiver when a remote monitoring transmitter of the at least one remote monitoring transmitter is within a transmit range of the hub transceiver for storage on the hub transceiver's memory,
   said system being configured to store at least a portion of the captured input data on the on-board memory of the remote monitoring transmitter and to scan available channels to send to a foreign hub transceiver at the maximum transmission power level, identification information regarding identity of the law enforcement officer when the remote monitoring transmitter is not within said transmit range of the hub transceiver.

2. The remote monitoring system of claim 1, wherein the remote monitoring transmitter is further configured to transmit the captured input data stored in the on-board memory to the hub transceiver when the remote-monitoring transmitter reenters transmit range of the hub transceiver.

3. The remote monitoring system of claim 1, wherein the remote monitoring transmitter is further configured to transmit the captured input data stored in the on-board memory to an additional remote monitoring transmitter for further transmission to the hub transceiver.

4. The remote monitoring system of claim 1, wherein the remote monitoring transmitter transmits to the hub transceiver via a Wi-Fi link.

5. The remote monitoring system of claim 1, wherein the hub transceiver retransmits the data received from the remote monitoring transmitter to a host controller via a radio-frequency link.

6. The remote monitoring system of claim 1, wherein the input device is a microphone and wherein the captured input data is audio data.

7. The remote monitoring system of claim 1, wherein the input device is a GPS receiver and wherein the captured input data is positional data for the law enforcement officer.

8. The remote monitoring system of claim 1, wherein the input device is a video camera and wherein the captured input data is video data.

9. The remote monitoring system of claim 1, wherein the input device is a fingerprint scanner and wherein the captured input data is fingerprint data of a suspect.

10. The remote monitoring system of claim 1, wherein a security code embedded in a transmission of the identification information contains seed values for generating a pseudo-random hop sequence and hop channels, in order to synchronize with a hop sequence associated with the foreign hub transceiver.

11. A remote monitoring transmitter configured to be worn or carried by a law enforcement officer, comprising:
    a processor;
    an input device for capturing input data;
    a biometric sensor for detecting information indicative of a mental state of the law enforcement officer,
    a transmitter; and
    one or more non-transitory computer-readable media,
    wherein the one or more non-transitory computer-readable media store computer-executable instructions that, when executed by the processor, cause the remote monitoring transmitter to:
    determine an emergency based on the detected information indicative of the mental state of the law enforcement officer and, in response, cause the transmitter to transmit an emergency signal, adjusted to a maximum transmission power level,
    said emergency signal comprising identification information regarding the law enforcement officer; and
    determine whether the remote monitoring transmitter is in transmit range of a hub transceiver associated with a law-enforcement vehicle;
    when the remote monitoring transmitter is in transmit range of the hub transceiver, cause the transmitter to transmit at least a portion of the captured input data to the hub transceiver for storage at the hub transceiver; and
    when the remote monitoring transmitter is not in transmit range of the hub transceiver, cause the at least a portion of the captured input data to be stored in the one or more non-transitory computer-readable media and transmit the emergency signal at the maximum transmission power level to a foreign hub transceiver based on the mental state of the law enforcement officer.

12. The remote monitoring transmitter of claim 11, wherein the remote monitoring transmitter is further configured to transmit the captured input data stored in the one or more non-transitory computer-readable media to the hub transceiver when the remote-monitoring transmitter reenters transmit range of the hub transceiver.

13. The remote monitoring transmitter of claim 11, wherein the remote monitoring transmitter is further configured to transmit the captured input data stored in the one or more non-transitory computer-readable media to an additional remote monitoring transmitter for further transmission to the hub transceiver.

14. The remote monitoring transmitter of claim 11, wherein the transmitter transmits via a Wi-Fi link.

15. The remote monitoring transmitter of claim 11, wherein the hub transceiver retransmits the data received from the remote monitoring transmitter to a host controller via a radio-frequency link.

16. The remote monitoring transmitter of claim 11, wherein the input device is a microphone and wherein the captured input data is audio data.

17. The remote monitoring transmitter of claim 11, wherein the input device is a GPS receiver wherein the captured input data is positional data for the law enforcement officer, and wherein a repeating voice message containing a name and location of the officer that is down is transmitted.

18. The remote monitoring transmitter of claim 11, wherein the input device is a video camera and wherein the captured input data is video data.

19. The remote monitoring transmitter of claim 11, wherein the input device is a fingerprint scanner and wherein the captured input data is fingerprint data of a suspect.

20. The remote monitoring transmitter of claim 11, wherein a security code embedded in a transmission of the identification information contains seed values for generating a pseudo-random hop sequence and hop channels, in order to synchronize with a hop sequence associated with the foreign hub transceiver.

* * * * *